United States Patent [19]
Cullen

[11] Patent Number: 5,408,809
[45] Date of Patent: Apr. 25, 1995

[54] AGRICULTURAL FEED BAGGING MACHINE HAVING AN IMPROVED BAG PAN SUPPORT

[75] Inventor: Steven R. Cullen, Astoria, Oreg.

[73] Assignee: Versa Corporation, Astoria, Oreg.

[21] Appl. No.: 200,759

[22] Filed: Feb. 23, 1994

[51] Int. Cl.⁶ .................. B65B 63/02; B65B 9/10
[52] U.S. Cl. .................. 53/567; 53/527; 100/100
[58] Field of Search ............. 53/527, 530, 567, 118; 100/100; 141/114, 10, 98, 313, 314

[56] References Cited

U.S. PATENT DOCUMENTS

| | | | |
|---|---|---|---|
| 3,687,064 | 8/1972 | Glanz | 100/100 |
| 3,791,593 | 2/1974 | Griffin | 239/667 |
| 4,046,068 | 9/1977 | Eggenmüller et al. | 100/100 |
| 4,308,901 | 1/1982 | Lee | 141/114 |
| 4,310,036 | 1/1982 | Rasmussen et al. | 141/114 |
| 4,337,805 | 7/1982 | Johnson et al. | 141/71 |
| 4,502,378 | 3/1985 | Cullen | 100/65 |
| 4,610,123 | 9/1986 | Krone et al. | 53/118 |
| 4,621,666 | 11/1986 | Ryan | 100/100 |
| 4,653,553 | 3/1987 | Cox et al. | 141/114 |
| 4,688,480 | 8/1987 | Ryan | 100/144 |
| 4,724,876 | 2/1988 | Ryan | 141/114 |
| 4,945,715 | 8/1990 | Brodrecht | 53/567 |
| 4,949,633 | 8/1990 | Johnson et al. | 100/100 |
| 5,159,877 | 11/1992 | Inman et al. | 100/144 |
| 5,220,772 | 6/1993 | Koskela et al. | 53/567 |
| 5,269,829 | 12/1993 | Meyer | 71/9 |
| 5,295,554 | 3/1994 | Cullen | 180/236 |
| 5,297,377 | 3/1994 | Cullen | 53/527 |

Primary Examiner—Lowell A. Larson
Assistant Examiner—Rodney A. Butler
Attorney, Agent, or Firm—Zarley, McKee, Thomte, Voorhees & Sease; Dennis L. Thomte

[57] ABSTRACT

A bag pan is provided for an agricultural bagging machine wherein the bag pan includes a support which is pivotally secured to the axle of the machine and which is adapted to have various sizes of bag pans removably positioned thereon. A handle extends forwardly from the bag pan support towards the forward end of the machine. When the handle is in its upper position, the bag pan rests on the ground so that the bag may be loaded thereonto. When the handle is in its lower and locked position, the folded bag is supported on the bag pan with the proper amount of clearance being provided between the bag pan and the tunnel floor.

6 Claims, 3 Drawing Sheets

AGRICULTURAL FEED BAGGING MACHINE HAVING AN IMPROVED BAG PAN SUPPORT

BACKGROUND OF THE INVENTION

1. Field of the Invention

This invention relates to an agricultural feed bagging machine and more particularly to an agricultural feed bagging machine having an improved bag pan support provided thereon.

2. Background Information

Agricultural feed bagging machines have been employed for several years to pack or bag silage or the like into elongated plastic bags. Two of the earliest bagging machines are disclosed in U.S. Pat. Nos. 3,687,061 and 4,046,068. In the prior art bagging machines, silage or the like is supplied to the forward or intake end of the bagging machine and is fed to a rotor or the like which conveys the silage into a tunnel on which the bag is positioned so that the bag is filled. As the silage is loaded into the bag, the bagging machine moves away from the filled end of the bag in a controlled fashion so as to achieve uniform compaction of the silage material within the bag.

The empty elongated plastic bags are in a folded condition and are initially positioned over the rearward end of the tunnel of the machine. The conventional tunnels have a curved top wall, downwardly extending side walls and a floor located at the lower forward end thereof. Normally, the tunnel has a bag pan positioned below the floor which supports the lower end of the folded bag to keep the folded bag from dragging on the ground beneath the bagging machine. Normally, the conventional bag pans are pivotally secured at their forward ends to the machine and are raised and lowered by means of chains connected to the opposite ends of the rearward end of the bag pan. The prior art chain supports for the bag pans normally required that one side of the bag pan be lifted at a time with a proper chain link being located and secured so that there would be sufficient clearance between the bag pan and the tunnel floor bottom to enable the bag to slide and pass from the tunnel without ripping while yet preventing the entire bag from pulling from the tunnel at one time.

SUMMARY OF THE INVENTION

An improved bag pan is provided for an agricultural feed bagging machine with the bag pan comprising a pair of rearwardly extending and horizontally spaced-apart support arms which are operatively pivotally secured to the frame of the bagging machine. An elongated handle is operatively secured to the support arms and extends forwardly beneath the machine to the forward end of the machine. Bag pans of various sizes may be selectively removably secured to the bag pan support arms so that the bag pan will be positioned beneath the tunnel floor for properly supporting the folded bag with the proper amount of clearance. When the handle is moved to its upper position, the bag pan will rest on the ground. When the handle is moved to its fixed and locked position, the bag pan will be properly positioned beneath the tunnel floor with the proper amount of clearance therebetween to enable the bag to slide therefrom without tearing the bag while yet preventing the entire bag from pulling from the bag pan.

It is therefore a principal object of the invention to provide an agricultural feed bagging machine having an improved bag pan.

Still another object of the invention is to provide a bag pan for an agricultural feed bagging machine wherein the bag pan is raised and lowered by means of an elongated handle which is operatively secured to the bag pan and which extends to the front of the machine.

Yet another object of the invention is to provide a bag pan for an agricultural feed bagging machine which enables the bag pan to be properly positioned in a convenient fashion.

These and other objects will be apparent to those skilled in the art.

DESCRIPTION OF THE PREFERRED EMBODIMENT

Figure 1:
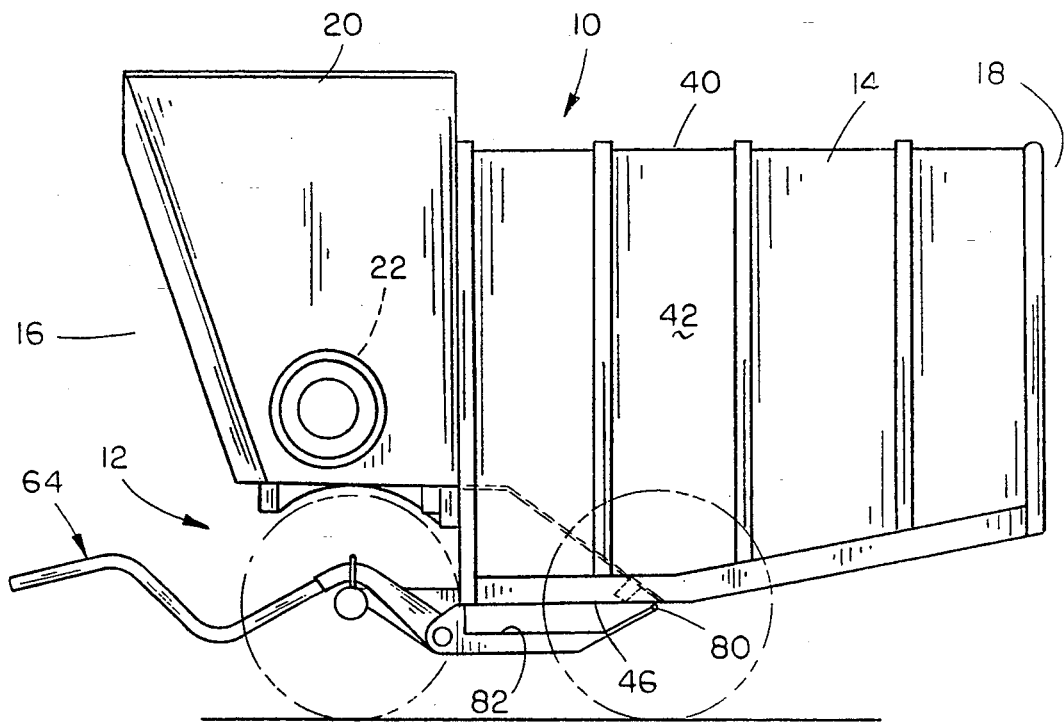
FIG. 1 is a side view of the improved bag pan support of this invention in a raised position.

The numeral 10 refers to an agricultural bagging machine which is substantially conventional in design except for the improved bag pan as will be described hereinafter.

Machine 10 includes a wheeled frame means 12 having a tunnel 14 mounted thereon upon which is normally positioned the open mouth of a conventional agricultural bag. Although the preferred embodiment includes a wheeled frame means, a non-wheeled frame means could be employed. For purposes of conciseness, the power means for driving the various components of the machine have not been disclosed since the same does not form a part of the invention. The power means could be an engine mounted on the machine or a power take off shaft connected to a tractor power take off. Further, although the machine is ideally suited for use with silage material or the like, the same could possibly be used with compost or the like.

For purposes of description, the bagging machine 10 will be described as including a forward end 16 and a rearward end 18. Bagging machine 10 includes a hopper means 20 at the forward end thereof which is adapted to receive the material to be bagged from a truck; wagon, etc. A rotatable rotor 22 of conventional design is located at the lower end of the hopper means 20 for forcing the materials to be bagged into the tunnel 14 and into the bag in conventional fashion.

For purposes of description, tunnel 14 will be described as including a top portion 40 and opposite sides wall 42 and 44. Tunnel 14 also includes a floor portion 46 which is located at the lower forward end of the tunnel 14.

The improved bag pan of this invention is referred to generally by the reference numeral 48 and includes a pair of supports 50 and 52 which are secured to the axle 54 of the machine 10 or such other convenient structure as may be desired. A rotatable pipe or shaft 56 is rotatably secured to and extends between the rearward ends of supports 50 and 52 and has a pair of support arms 58 and 60 secured thereto as illustrated in the drawings. Each of the support arms 58 and 60 are provided with a plurality of bolt openings 62 formed therein adapted to receive conventional bolts.

Figure 5:
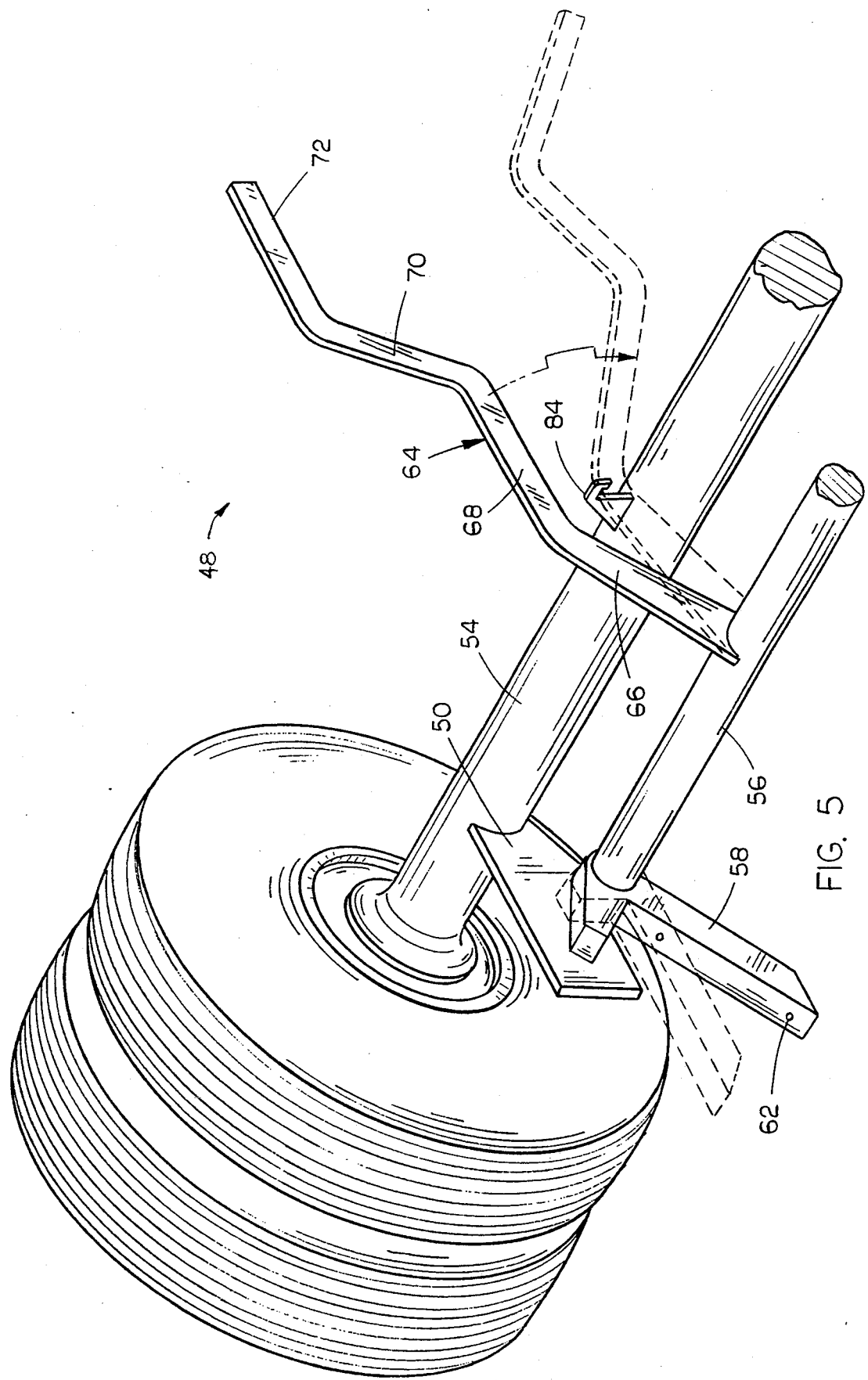
FIG. 5 is a front view of the bagging machine having the bag pan of this invention mounted thereon.

An elongated handle 64 is secured at its rearward end to the shaft 56 by welding or the like and extends forwardly therefrom as best illustrated in FIG. 5. As seen in FIG. 5, handle 64 extends over axle 54 and includes handle portions 66, 68, 70 and 72.

Figure 2:
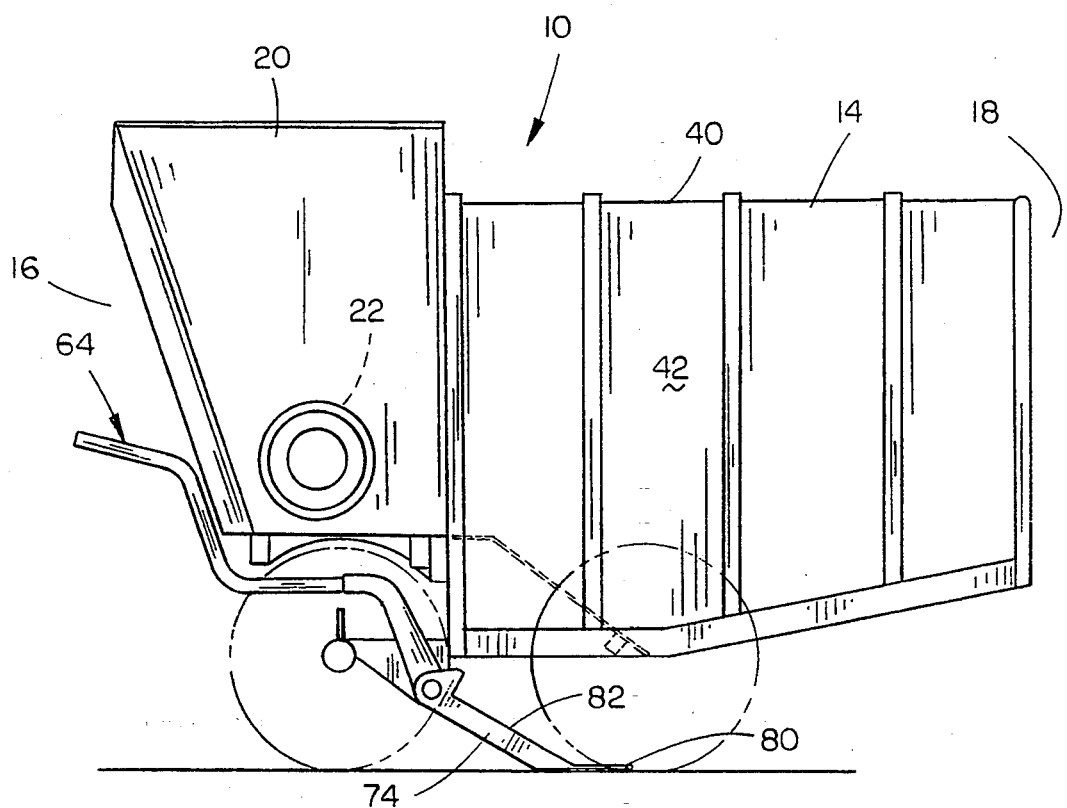
FIG. 2 is a side view of the improved bag pan support in a lowered position.
Figure 3:
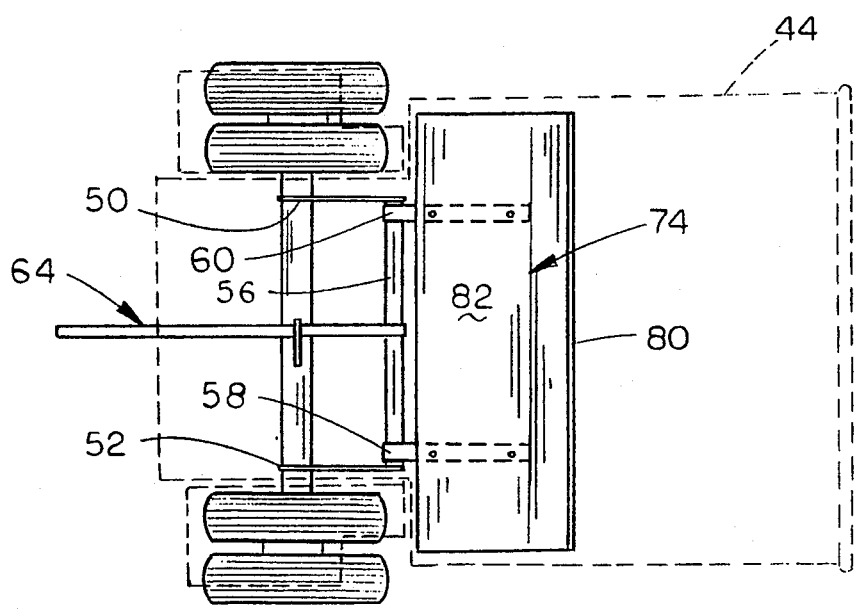
FIG. 3 is a top view of the bag pan of this invention.
Figure 4:
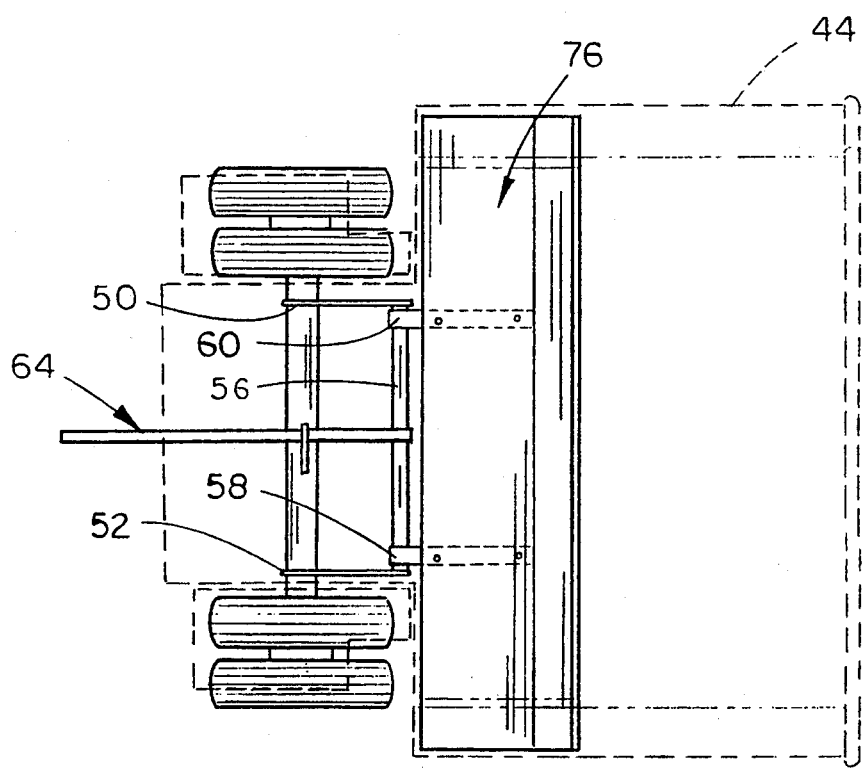
FIG. 4 is a top view of the bag pan support similar to FIG. 3 but which illustrates a larger pan mounted thereon.

Supports 58 and 60 are adapted to have a bag pan 74 mounted thereon by means of bolts extending therethrough. Inasmuch as the bag pan 74 is removably secured to the supports 58 and 60, bag pans of various lengths may be removably secured thereto so that the machine may accommodate tunnels of different dimensions. In FIG. 3, the numeral 74 refers to an 8 foot bag pan while the numeral 76 refers to a 9 foot bag pan, both of which may be removably mounted on the supports 58 and 60. As seen in FIG. 2, each of the bag pans 74 and 76 have an upwardly and rearwardly extending bag retainer portion 80, the upper end of which is adapted to engage the floor of the tunnel to provide proper clearance between the base 82 of the bag pan and the floor of the tunnel.

In FIG. 2, the broken lines illustrate the handle 64 in its upper position with the bag pan 74 being in ground engagement. When the pan 74 is in ground engagement as illustrated by broken lines in FIG. 2, the folded bag may be pushed up and onto the pan 74 without lifting the bag itself. When the bag has been properly positioned on the pan 74, the handle 64 is then moved from the position of FIG. 2 to the position illustrated in FIG. 1. The handle 72 is then positioned beneath the catch 84 as illustrated by broken lines in FIG. 5 which locks the bag pan 74 in its upper position. In the upper position, the upper rearward end of the bag retainer portion 80 engages the underside of the floor portion 46 of the tunnel 14 so that proper clearance between the bag pan 74 and the floor portion 46 is achieved. When the handle 72 is in its locked position, the bag pan 74 is properly positioned and automatically provides the proper clearance required with no further adjustments being required. Thus, with a single movement of the handle 72, the bag pan 74 is properly positioned with respect to the tunnel floor. The handle is quickly and easily movable between its upper and lower positions.

Thus it can be seen that the invention accomplishes at least all of its stated objectives.

I claim:

1. An agricultural feed bagging machine for bagging agricultural feed material into agricultural bags having a closed end and an open mouth comprising:
   a wheeled frame having rearward and forward ends;
   a tunnel on said wheeled frame and having an intake end for receiving the material to be bagged and an output end adapted to receive the open mouth of the agricultural bag;
   said tunnel having a top wall, opposite side walls and a floor;
   a hopper on said wheeled frame forwardly of said tunnel for receiving the material to be bagged;
   means at the intake end of said tunnel for forcing the material to be bagged from said hopper into said tunnel and into said bag;
   a horizontally disposed bag pan positioned beneath said tunnel floor for supporting the lower portion of a folded bag positioned on said tunnel;
   said bag pan having rearward and forward ends and opposite sides;
   said bag pan being pivotally secured, about a horizontal axis, at its forward end to said wheeled frame;
   said bag pan being pivotally movable between an upper bag supporting position and a lower bag loading position;
   and a single elongated handle secured to said bag pan between the sides thereof and extending forwardly therefrom to the forward end of said wheeled frame for selectively pivotally moving said bag pan between its said upper and lower positions from the forward end of said wheeled frame.

2. The machine of claim 1 wherein means is provided for selectively maintaining said handle in the position wherein said bag pan is in its said upper position.

3. The machine of claim 2 wherein said means for selectively maintaining said handle in the position wherein said bag pan is in its said upper position comprises a catch means mounted on said wheeled frame which extends over said handle.

4. An agricultural feed bagging machine for bagging agricultural feed material into agricultural bags having a closed end and an open mouth comprising:
   a wheeled frame having rearward and forward ends;
   a tunnel on said wheeled frame and having an intake end for receiving the material to be bagged and an output end adapted to receive the open mouth of the agricultural bag;
   said tunnel having a top wall, opposite side walls and a floor;
   a hopper on said wheeled frame forwardly of said tunnel for receiving the material to be bagged;
   means at the intake end of said tunnel for forcing the material to be bagged from said hopper into said tunnel and into said bag;
   a bag pan support pivotally mounted about a horizontal axis, on said wheeled frame;
   a bag pan removably mounted on said bag pan support whereby bag pans of different widths may be mounted thereon;
   said bag pan adapted to support the lower portion of a folded bag positioned in said tunnel;
   said bag pan support being pivotally movable between an upper bag supporting position and a lower bag supporting position;
   and a single elongated handle secured to said bag pan support between the opposite sides of said bag pan and extending forwardly therefrom to the forward end of said wheeled frame for selectively pivotally moving said bag pan support between its said upper and lower positions from the forward end of said wheeled frame.

5. The machine of claim 4 wherein said bag pan support includes a pair of rearwardly extending and horizontally spaced support arms for supporting the bag pan thereon.

6. An agricultural feed bagging machine for bagging agricultural feed material into agricultural bags having a closed end and an open mouth comprising:
   a wheeled frame having rearward and forward ends;
   a tunnel on said wheeled frame and having an intake end for receiving the material to be bagged and an output end adapted to receive the open mouth of the agricultural bag;
   said tunnel having a top wall, opposite side walls and a floor;
   a hopper on said wheeled frame forwardly of said tunnel for receiving the material to be bagged;

means at the intake end of said tunnel for forcing the material to be bagged from said hopper into said tunnel and into said bag;

said wheeled frame including a transversely extending axle having wheels at the opposite ends thereof;

a pair of horizontally spaced-apart supports secured to said axle and extending rearwardly therefrom;

an elongated shaft operatively rotatably secured to said spaced-apart supports and extending therebetween;

at least first and second elongated bag pan supports secured to said shaft for rotation therewith and extending rearwardly therefrom;

an elongated handle secured to said shaft between the ends thereof and extending forwardly therefrom to the forward end of said wheeled frame for selectively rotating said shaft and said bag pan supports between first and second positions;

a bag pan removably mounted on said first and second bag pan supports whereby bag pans of different widths may be mounted thereon;

a locking device associated with said handle to selectively maintain said shaft and said bag pan supports in said first position.

* * * * *